METHOD AND MEANS FOR RECOGNIZING COMPLEX PATTERNS

Filed March 25, 1960 2 Sheets-Sheet 1

INVENTOR.
Paul V. C. Hough
BY
Roland G. Quaintance
Attorney

INVENTOR.
Paul V. C. Hough
BY
[signature]
Attorney

United States Patent Office 3,069,654

Patented Dec. 18, 1962

3,069,654

METHOD AND MEANS FOR RECOGNIZING COMPLEX PATTERNS

Paul V. C. Hough, Ann Arbor, Mich., assignor to the United States of America as represented by the United States Atomic Energy Commission Filed Mar. 25, 1960, Ser. No. 17,715
6 Claims. (Cl. 340—146.3)

This invention relates to the recognition of complex patterns and more specifically to a method and means for machine recognition of complex lines in photographs or other pictorial representations.

This invention is particularly adaptable to the study of subatomic particle tracks passing through a viewing field. As the objects to be studied in modern physics become smaller, the problem of observing these objects becomes increasingly more complex. One of the more useful devices in observing charged particles is the bubble chamber wherein the charged particles create tracks along their path of travel composed of small bubbles approximately 0.01 inch apart, depending upon the specific ionization of the initiating particle. These tracks form complex patterns and are readily photographed with the use of a dark background. With this device, multitudinous photographs are produced with each photograph requiring several hours study by a trained observer to recognize the complex patterns of the tracks. It is therefore readily apparent, that as the photographs increase in number, the time consumed by a trained observer to study them becomes excessive and, unless large numbers of trained observers are used, the reduction of data falls far behind the production rate.

It is one object of this invention to provide a method and means for the recognition of complex patterns in a picture.

It is another object of this invention to provide an improved method and means for recognizing particle tracks in pictures obtained from a bubble chamber.

In general, the objects of this invention are accomplished by dividing the viewed representation into sufficiently small sectors or framelets that the complex pattern is divided into substantially straight line segments. Each of the segments is detected and transformed into slope and intercept data which may be stored and later analyzed for the presence of desired patterns.

A more complete understanding of the invention will best be obtained from consideration of the accompanying drawings in which.

Figure 1:
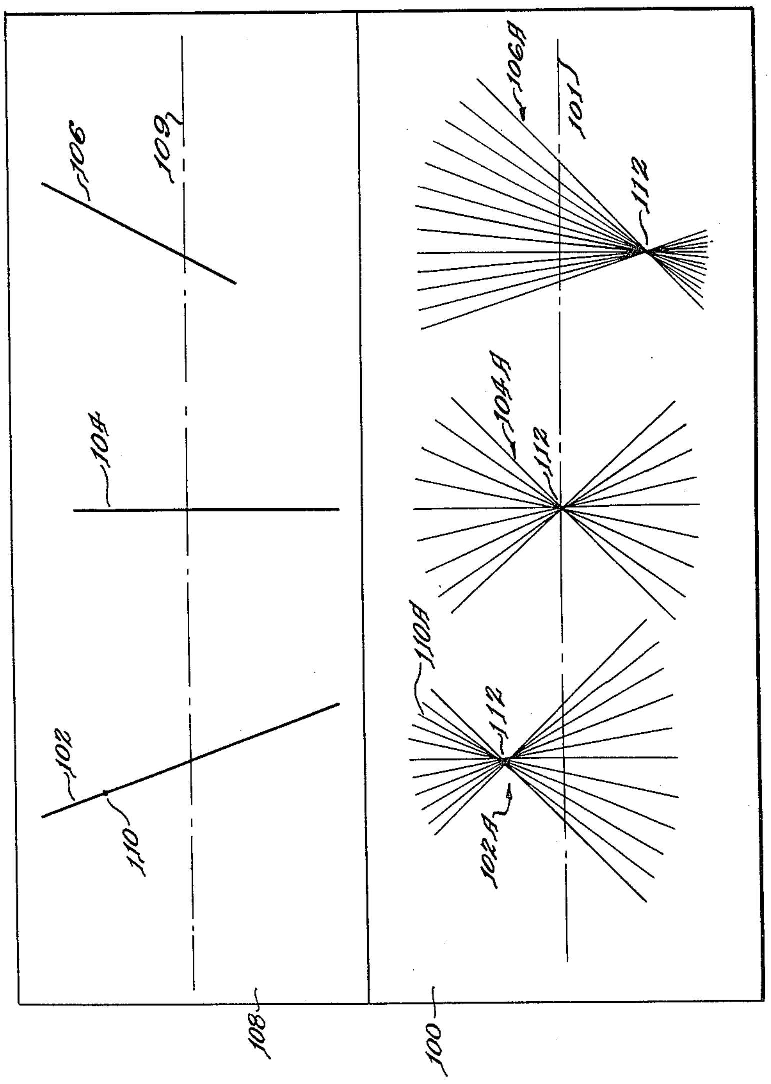
FIG. 1 is an illustration of a plane transform representation of straight line segments.

A geometric construction by hand is shown in FIGURE 1 which depicts three straight line segments 102, 104 and 106 in a framelet 108 and their corresponding sketched plane transforms 102A, 104A, and 106A in picture 100. The geometry of construction for the plane transforms is accomplished according to the following rules.

(1) For a given point on a line segment in framelet 108, a line is drawn in the transformed plane in picture 100.

(2) For a point on the line at the top of the framelet 108, the line in the transformed plane is inclined 45° to the right; a point on the line segment at the horizontal midline of the framelet 108 gives a vertical line in the plane transform; a point on the line segment at the bottom of the framelet 108 gives a line in the transformed plane inclined at 45° to the left. In general, the line in the transformed plane has an angle relative to the vertical whose tangent is proportional to the vertical displacement of the point on the line segment from the horizontal midline 109 of the framelet 108.

(3) Each line in the transformed plane is made to have an intercept with the horizontal midline 101 of the picture 100 equal to the horizontal coordinate of its respective point on the line segment in framelet 108.

Thus, for a given reference point 110 on line segment 102 a line 110A is drawn in the plane transform 102A. The reference point 110 is approximately midway between the top and the horizontal midline 109 of framelet 108 and hence the line 110A is inclined to the right at an angle to the vertical whose tangent is approximately ½. The intersection of the line 110A with the horizontal midline 101 of picture 100 is at a distance from the left edge of the picture 100 equal to the horizontal coordinate of the point 110 on line segment 102.

It is an exact theorem that, if a series of points in a framelet lie on a straight line, the corresponding lines in the plane transform intersect in a point which we shall designate as a knot 112. It is therefore readily apparent that the rectangular coordinates of the knots 112 in picture 100 have the following properties:

(1) The horizontal coordinates of the knots 112 equal the horizontal coordinates in the framelet 108 at which the straight line segments 102, 104 and 106 intercept the horizontal midline 109 of the framelet 108.

(2) The vertical coordinate of the knots 112, relative to the horizontal midline 101 of picture 100, is proportional to the tangent of the angle of the straight line segments 102, 104 and 106 relative to the vertical. Thus, the coordinates of the knots 112 in the plane transforms 102A, 104A and 106A give the slopes and intercepts of the straight line segments 102, 104 and 106 in framelet 108.

Although the foregoing description pertained to a hand construction of a plane transform, it is to be understood that it may be performed by adequate electronic apparatus or the like.

Figure 2:
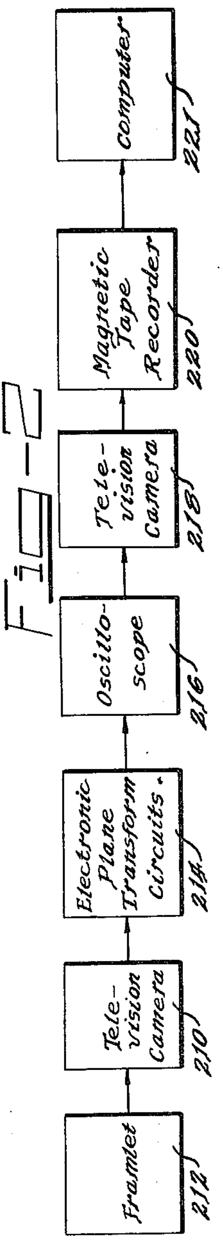
FIG. 2 is a block diagram of an apparatus according to teachings of the present invention.

In FIG. 2, the picture containing the complex pattern, such as from a photograph of a bubble chamber, is subdivided into several hundred rectangular areas or framelets. The height of each framelet is chosen small enough so that the portions of the pattern within each framelet is essentially a straight line and large enough so that the line segments can be reliably distinguished from the random bubble background. The width of the framelet is dependent upon the accuracy needed in the measurement of the lateral position of the segments in the framelet.

A television camera 210, such as of the image orthicon type, scans the framelet 212 containing one or more straight line segments composed of bubbles. As the scanning beam of the television camera 210 passes over a bubble in the line segment, the television camera 210 produces an output pulse. For each output pulse from the television camera 210, electronic plane transform circuits 214 cause a line to be drawn in a plane transform on a display of an oscilloscope 216 according to the geometric rules described for FIG. 1. Thus a plane transform of the line segment of framelet 212 is created. The coordinates of the knot in the plane transform on the display of oscilloscope 216 gives the slope and intercept of the line segment in framelet 212 as previously shown in FIG. 1.

A second television camera 218, such as of the image orthicon type, scans the plane transform display of oscilloscope 216 and detects the knot with its relative coordinate data. The output of the second television camera 218 containing the coordinate data of the knot is fed to magnetic tape recorder 220 and stored thereon. The magnetic tape is then fed into a computer 221, such as of the IBM704 type, where the coordinate data of each line segment is evaluated to recognize the original complex pattern in the picture.

When a standard image orthicon television camera scans a bubble chamber scene, the bubbles appear in the scan line as narrow regions where the video output voltage is much less than the background voltage on each side. The background video signal also shows considerable variation, and so a means must be provided for recognizing bubbles in a varying background, and for discriminating against various unwanted markings in the scene. A video pulse must satisfy two basic criteria to be admitted as corresponding to a bubble. These are: (*a*) A narrowness criterion. The bubbles making up a track have a narrow and relatively constant width. Therefore, only video pulses of this width (within a certain tolerance) are admitted. Wider opaque regions in the scene are ignored. (*b*) A contrast threshold. The difference in light intensity between the dark track and the lighter background on each side must be greater than a certain minimum value. This threshold is a parameter of the system which is easily adjusted. It is set to give the most reliable track detection and highest background rejection for any particular groups of pictures.

Figure 3:
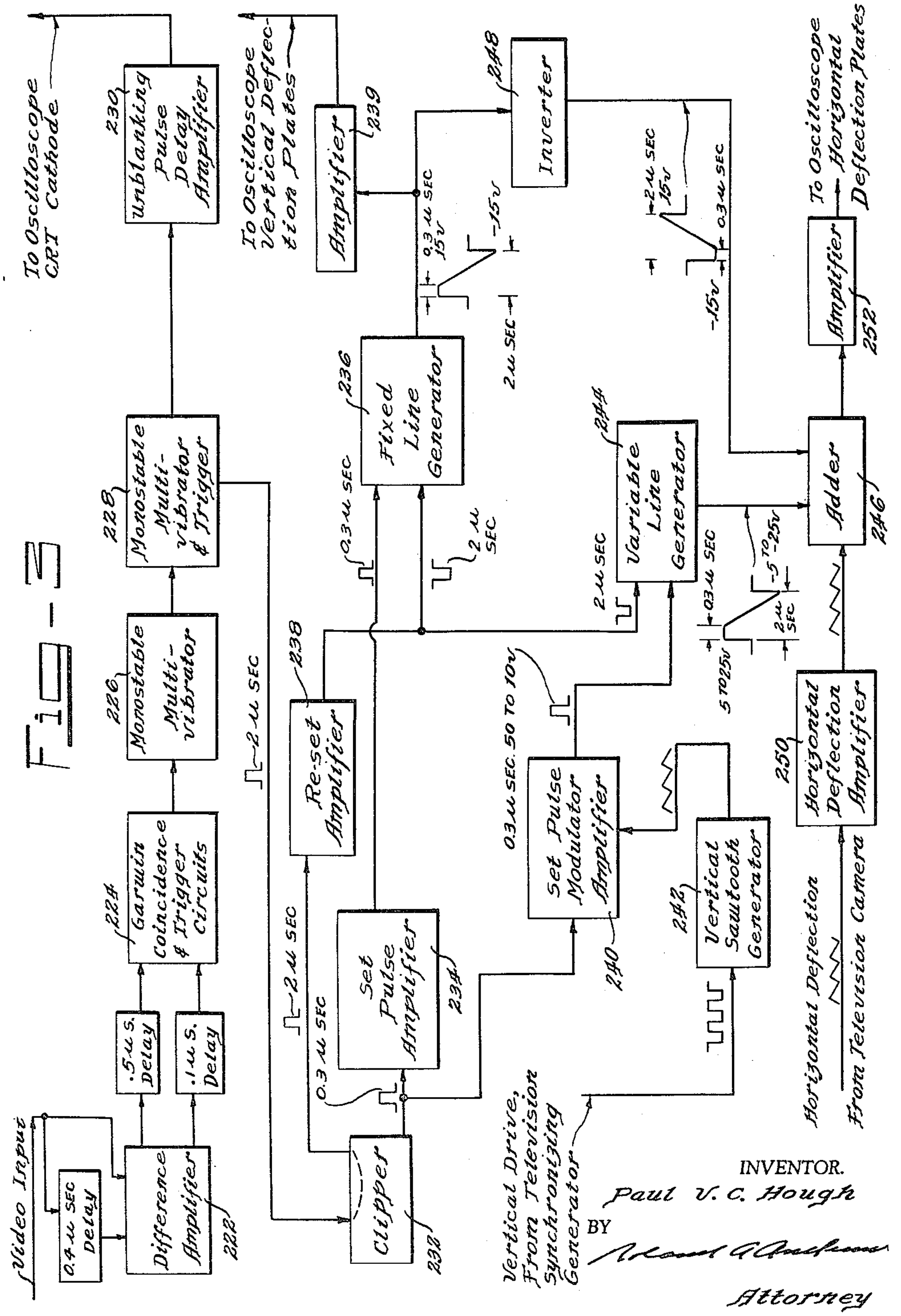
FIG. 3 is a detailed block diagram illustrating the electronic plane transform circuits of the apparatus in the embodiment of the present invention, shown in FIG. 2.

Reference is now made to FIG. 3 for a detailed explanation of the circuits 214 wherein the pulses from the television camera 210 representing bubbles in the line segment in the viewed scene are converted into the more useable plane transform pattern. For the purposes of clarity, only one detected bubble on the line segment of the framelet 212 will be treated although the treatment of all other detected bubbles is the same.

The video signal from the first television camera 210 is presented undelayed to a first input of a difference amplifier 222 and also delayed 0.4 microsecond to a second input of the difference amplifier 222. The difference in amplitude between the two outputs of the difference amplifier 222 represent the difference in light level at two points along the scan line of the first television camera 210 separated by half the width of a bubble in the line segment of framelet 212. The output from the difference amplifier 222 corresponding to the 0.4 microsecond input is fed through a 0.1 microsecond delay line to a first input of a Garwin coincidence circuit 224. The other output of the difference amplifier is delayed approximately .5 microsecond to the other input of the Garwin circuit so that the two signals arrive at the coincidence circuit simultaneously. Any opacity greater than twice the width of the bubble in the line segment of framelet 212 fails to trigger the Garwin circuit 224 and is therefore ignored. The output pulse amplitude of the Garwin coincidence circuit 224 will depend upon the difference in light intensity between the bubble in the line segment and the general background. Smaller output pulses from the Garwin coincidence circuit 224 will be present due to variations in intensity of the general background. These are eliminated by feeding the output of the Garwin coincidence circuit 224 to a 0.5 microsecond monostable multivibrator 226 where the bias of the trigger is set so that only pulses from the bubbles in the line segment of framelet 212 have sufficient amplitude to trigger the multivibrator 226. Thus, a single pulse output is obtained from the multivibrator 226 when the scanning beam of the first television camera 210 passes over the bubble in the line segment of framelet 212.

The output pulse of the multivibrator 226 triggers a 2 microsecond monostable multivibrator 228. One output from the monostable multivibrator 228 drives an unblanking amplifier 230 in which the pulse is delayed 0.3 microsecond, clipped to a length of 1.4 microsecond, amplified, and applied to the cathode of the cathode ray tube in the oscilloscope 216. This pulse thus turns on the beam of the cathode ray tube of the oscilloscope 216 for a period of time, approximately 1.5 microsecond, sufficient to draw the line transform corresponding to the bubble scanned. The second output from the monostable multivibrator 228 drives a clipper 232 which provides a 0.3 microsecond pulse output at the leading edge of the output pulse of the monostable multivibrator 228.

The output from the clipper 232 is fed to a set pulse amplifier 234 where it is amplified and provides a 0.3 microsecond pulse of fixed voltage, 15 volts, which is applied to the fixed line generator 236. A 2 microsecond output pulse is also derived from the clipper 232 which is identical to the 2 microsecond output pulse of the monostable multivibrator 228. This 2 microsecond output pulse from the clipper 232 is fed to a reset amplifier 238 where it is amplified and inverted. Both the inverted 2 microsecond pulse from the reset amplifier and the 15 volt output pulse from the set pulse amplifier are fed simultaneously to the fixed line generator 236. The 15 volt output pulse applied to the fixed line generator 236 is caused to decay therein at a predetermined linear rate of decay to −15 volts. The 2 microsecond inverted pulse from the reset amplifier 238 gates the decay of the 15 volt pulse from the set pulse amplifier 234 and causes it to be clamped at −15 volts. The resulting 2 microsecond linear decay waveform output from the fixed line generator 236 is amplified by the amplifier 239 and then applied to the vertical deflection plates of the oscilloscope 216.

The 0.3 microsecond pulse from clipper 232 is also fed to a set pulse modulator-amplifier 240 where it is modulated. The modulation is provided by a vertical sawtooth generator 242 which is synchronized with the vertical deflection of television camera 210. The modulation is such that when the vertical deflection of television camera 210 is at the top of the television field, the amplitude of the 0.3 microsecond pulse is 50 volts and the amplitude of the pulse drops linearly to 10 volts when the vertical deflection of the television camera 210 is at the bottom of the television field. The 0.3 microsecond set pulse from the set pulse modulator-amplifier 240 is fed to a variable line generator 244. There, the variable amplitude of the set pulse is set to 25 volts for the time when the vertical deflection of the television camera 210 is at the top of the television field and 5 volts when the vertical deflection is at the bottom of the television field, intermediate points decaying linearly thereto. The variable line generator 244 causes the set pulse from the set pulse modulator-amplifier 240 to decay therein at a predetermined rate of decay and linear waveform to −25 volts for the vertical deflection being at the top of the television field to −5 volts for the vertical deflection being at the bottom of the television field. The 2 microsecond inverted pulse from the reset amplifier 238 is applied to the variable line generator 244 simultaneously with the 0.3 microsecond set pulse from the set pulse modulator-amplifier 240 and gates the set pulse causing it to be clamped at the aforementioned negative voltages. The resulting 2 microsecond variable-amplitude linear-decay output pulse from the variable line generator 244 is fed to an input of adding circuit 246.

The 2 microsecond linear decay pulse from the fixed line generator 236 is inverted by an inverting circuit 248 and fed to an input of adding circuit 246. An output is taken from the horizontal deflection circuit of television camera 210, amplified by the horizontal deflection amplifier 250 and applied to an input of adding circuit 246. The adding circuit 246 acts on the three inputs in the following manner. If triggered when the vertical deflection of the television camera 210 is at the top of the television field, the 2 microsecond output pulse of the variable line generator 244 starts at 25 volts. The 2 microsecond inverted pulse of the line generator 236 always starts at −15 volts. The adding circuit 246 sums these two pulses into a linear decaying sweep that starts at 10 volts and decays to −10 volts. If the 2 microsecond pulse of the variable line generator 244 is triggered at the bottom of the television field of television camera 210, the result is a rising linear sweep starting at −10 volts and rising to 10 volts. If the 2 microsecond pulse of the variable line generator 244 is triggered in the center of the television field of television camera 210, the 2 microsecond pulse of the variable line generator 244 starts at 15 volts, cancelling the —15 volt 2 microsecond inverted pulse from the fixed line generator 236, and results in a zero output. The output from the horizontal deflection amplifier 250 is added to the combined variable amplitude linear sweep of the variable line generator 244 and the fixed line generator 236, amplified by an amplifier 252, and then applied to the horizontal deflection plates of oscilloscope 216.

Thus, a line is drawn in the plane transform for a bubble in the line segment of framelet 212. The linear sweep output of the fixed linear generator 236 applied to the vertical deflection plates of oscilloscope 216 acts in combination with the linear sweep of variable amplitude produced by adding the 2 microsecond inverted linear decay pulse from the fixed line generator 236 and the 2 microsecond variable amplitudes linear decay output pulse from the variable line generator 244 to produce a line in the plane transform having an angle to the vertical whose tangent is proportional to the vertical displacement of the detected bubble track in the line segment of framelet 212. If the detected bubble is at the top of framelet 212, the horizontal deflection applied to the horizontal deflection plates of oscilloscope 216 is initially large, positive, and decays linearly therefrom. If the detected bubble occurs at the center of framelet 212, the horizontal deflection is zero and if below the center of the framelet 212, the horizontal deflection is initially large and negative in polarity from which it decays linearly. The output from the horizontal deflection amplifier 250 causes the spot on the display of oscilloscope 216 to follow the horizontal scanning beam of the television camera 210. When the horizontal scanning beam crosses the detected bubble, the oscilloscope spot is at the horizontal position of the detected bubble and the video pulse at this instant causes the line transform to be drawn as heretofore described. The time required for the drawing of the one line in the transform is 1.5 microsecond. The delayed unblanking pulse of the unblanking pulse delay amplifier 230 gates the oscilloscope for this period of time. The set and reset of the line generators 236 and 244 is not seen in the transform.

The entire process described above is repeated each time the scanning beam of television camera 210 crosses a bubble in the line segment of framelet 212 and results in a plane transform being created on the oscilloscope display 216 as depicted in FIG. 1.

Though the above description illustrates the presentation of only one framelet at a time to the television camera, as many as four framelets can be presented at one time. Each framelet is caused to cover the full width and one-fourth the height of the television field; the remaining treatment of the framelets remaining the same as for a single framelet. It is also necessary to scan each picture twice at right angles to correctly recognize the complex patterns contained therein.

The present invention should be readily adaptable for application in such areas as handwriting analysis, radar displays and map reading.

Persons skilled in the art will, of course, readily adapt the general teachings of the invention to embodiments other than the specific embodiments illustrated. Accordingly the scope of the protection afforded the invention should not be limited to the particular embodiment shown in the drawings and described above, but shall be determined only in accordance with the appended claims.

What is claimed is:

1. A method of analyzing a complex pattern in a picture comprising dividing said picture into framelets, said framelets sized so that that any segment of said complex pattern therewithin is essentially a straight line, transforming each of said segments into a plane transform, and reading the coordinate position data of each plane transform.

2. The method of analyzing a complex pattern in a picture comprising dividing said picture into framelets, said framelets sized so that any segment of said complex pattern therewithin is essentially a straight line, transcribing points along each of said segments into separate lines, pictorially displaying said transcribed lines to form a plane transform for each of said segments, the coordinate position of said plane transform in said display being representative of the position of said segment in said framelet, and summing the coordinate position data.

3. A method of analyzing a complex pattern in a picture comprising dividing said picture into framelets, said framelets sized so that any segment of said complex pattern therewithin is essentially a straight line, transcribing points along each of said segments into separate lines, pictorially displaying said transcribed lines to form a plane transform for each of said segments, each line in said plane transform being positioned laterally so that a point on said line midway between the top and the bottom of said pictorial display occurs at a distance from the left edge of said pictorial display equal to a distance of said point in said segment from the left edge of said framelet, said line in said plane transform being inclined in said pictorial display at an angle to the vertical whose tangent is proportional to the vertical displacement of said point in said segment from the center of said framelet, and determining the coordinate position of the point of intersection of said lines in said pictorial display for each segment.

4. A method of analyzing a complex pattern in a picture comprising dividing said picture into framelets, said framelets sized so that any segment of said complex pattern therewithin is essentially a straight line; transcribing points along each of said segments into separate lines, pictorially displaying said transcribed lines to form a plane transform for each of said segments, each line in said plane transform being positioned laterally so that a point on said line midway between the top and the bottom of said pictorial display occurs at a distance from the left edge of said pictorial display equal to the distance of said point in said segment from the left edge of said framelet, each said line in said plane transform being inclined in said pictorial display at an angle to the vertical whose tangent is proportional to the vertical displacement of said point in said segment from the center of said framelet; scanning said pictorial display of said plane transform of each of said segments and determining the coordinate position of the intersection point of said lines in said pictorial display of said plane transform, the lateral position of said intersection point in said pictorial display of said plane transform being equal to the lateral position at which a point in said segment on said framelet is equidistant from the top and bottom of said framelet, the vertical position of said intersection point in said pictorial display of said plane transform denoting the tangent of the angle of said segment in said framelet; recording the coordinate data of said intersection point in said plane transform of each of said segments and summing said recorded data.

5. A device for electronically transforming a straight line in a pictorial representation into coordinate data comprising means for scanning said representation and producing an electrical pulse for each point scanned on said line, means for transforming each of said pulses into a separate line and for displaying each of said transformed lines, each of said transformed lines being geometrically positioned in said display with relation to the geometric position of its respective point in said representation, said transformed lines intersecting at a point in said display whose coordinate position is descriptive of the geometric position of said straight line in said representation.

6. A device for electrically transforming a straight line in a pictorial representation into coordinate data comprising means for scanning said representation and producing an electrical pulse for each point scanned on said line, a cathode ray tube having vertical and horizontal deflection plates, means for deriving a first linear decay signal having initial constant amplitude from each of said electrical pulses and applying said first signal to said vertical deflection plates of said cathode ray tube, means for deriving a second linear decay pulse having initial variable amplitude from each of said electrical pulses and applying said second signal to said horizontal deflection plates of said cathode ray tube, means for triggering the cathode of said cathode ray tube to cause said first and second signals of each of said electrical pulses to draw a line on said cathode ray tube having a slope and an intercept with the horizontal midline of said cathode ray tube proportional to the coordinate position of said scanned point in said pictorial representation, said lines having an intercept point whose coordinates on said cathode ray tube are proportional to the slope and the intercept with the horizontal midline of said pictorial representation of said straight line.

No references cited.